US011983016B2

(12) United States Patent
Vardi

(10) Patent No.: US 11,983,016 B2
(45) Date of Patent: May 14, 2024

(54) SMART VEHICLE HIGHWAY SYSTEM

(71) Applicant: Shlomo Vardi, Kadima Zoran (IL)

(72) Inventor: Shlomo Vardi, Kadima Zoran (IL)

(*) Notice: Subject to any disclaimer, the term of this patent is extended or adjusted under 35 U.S.C. 154(b) by 556 days.

(21) Appl. No.: 15/733,915

(22) PCT Filed: Jun. 25, 2019

(86) PCT No.: PCT/IB2019/055334
§ 371 (c)(1),
(2) Date: Dec. 1, 2020

(87) PCT Pub. No.: WO2020/003115
PCT Pub. Date: Jan. 2, 2020

(65) Prior Publication Data
US 2021/0223792 A1    Jul. 22, 2021

Related U.S. Application Data

(60) Provisional application No. 62/689,258, filed on Jun. 25, 2018.

(51) Int. Cl.
*G05D 1/00* (2006.01)
*G08G 5/00* (2006.01)
*G08G 5/04* (2006.01)

(52) U.S. Cl.
CPC ......... *G05D 1/0676* (2013.01); *G08G 5/0017* (2013.01); *G08G 5/0039* (2013.01); *G08G 5/045* (2013.01)

(58) Field of Classification Search
CPC .. G05D 1/0676; G08G 5/0017; G08G 5/0039; G08G 5/045

USPC .......................................... 701/16, 117, 411
See application file for complete search history.

(56) References Cited

U.S. PATENT DOCUMENTS

2017/0314949 A1* 11/2017 Rovik ................ G01C 21/3476
2017/0359197 A1* 12/2017 Stolfus ............. G08G 1/096816
2019/0326988 A1* 10/2019 McLaurin ............... H01S 5/005

FOREIGN PATENT DOCUMENTS

JP          2014048069 A    * 3/2014

OTHER PUBLICATIONS

Shaikh, Farheen Iqbal et al., "Path planning based QoS routing in VANET", 2017 International Conference on Big Data, IoT and Data Science (BID), IEEE, Dec. 20, 2017, pp. 37-43.

* cited by examiner

*Primary Examiner* — Isaac G Smith
(74) *Attorney, Agent, or Firm* — Browdy and Neimark, PLLC

(57) ABSTRACT

A computerized method and system provide for vehicle routing by providing a route of travel for a vehicle to a destination point. The traffic is continuously monitored, and should the traffic become congested and/or unbalanced, at, proximate to, or beyond (downstream) a junction along the route of travel, the route of travel for the vehicle is modified by at least one of: 1) changing at least a portion of the route of travel of the vehicle; or, 2) replacing the route of travel of the vehicle with a new route of travel.

16 Claims, 7 Drawing Sheets

SMART VEHICLE HIGHWAY SYSTEM

CROSS-REFERENCES TO RELATED APPLICATIONS

This application is related to and claims priority from commonly owned U.S. Provisional Patent Applications: U.S. Provisional Patent Application Ser. No. 62/689,258 entitled: Smart Vehicle Highway System, filed on Jun. 25, 2018, the disclosure of which is incorporated by reference in its entirety herein.

TECHNICAL FIELD

The present invention relates to the field of vehicle navigation, traffic congestion, and vehicle accidents.

BACKGROUND OF THE INVENTION

The dramatic increase in traffic load capacity during the last decade, along with the inadequate expansion of road infrastructures, has resulted in intolerable congestion of vehicles in traffic arteries on the one end, and an increase of vehicle accidents, on the other hand.

Past attempts to solve these issues by further expanding road infrastructures were proven to be, for the most part, temporary and restricted by limited land reserves and negative impact on the environment.

Other attempts, such as, assigning designated lanes for public transportation during rush-hour traffic and restricting certain highly dense areas to public transportation only have diverted the congestions to other areas and did not solve one of the main causes for traffic congestions, which is the inability to optimize and regulate the traffic relative to the road infrastructure supply and/or public transportation. These unsuccessful attempts have led to an increasing technological effort in order to develop more efficient solutions while taking into account the existing infrastructure. Satellite-based navigation assistance and collision prevention systems were found to be insufficient in solving these issues since these systems fail to concurrently predict traffic jams and prevent vehicle accidents.

SUMMARY OF THE INVENTION

The present invention is directed to a computerized method and system, and software product, for example, in the form of a non-transitory storage medium, for providing vehicle routing by providing a route of travel for a vehicle to a destination point. The traffic is continuously monitored, and should the traffic become congested and/or unbalanced, at, proximate to, or beyond (downstream from) a junction along the route of travel, the route of travel for the vehicle is modified by at least one of: 1) changing at least a portion of the route of travel of the vehicle; or, 2) replacing the route of travel of the vehicle with a new route of travel.

Embodiments of the invention are directed to a method for routing vehicle traffic in an area. The method comprises: a particular computer providing a requesting device with a route of travel for a vehicle to a destination point in response to a request from the device associated with the vehicle for a route of travel to a destination point; determining whether the vehicle is within a predetermined distance range from the location of a node associated with a junction having a known location, and the node is in communication with a particular computer; in response to a determination that the vehicle is within the predetermined distance range from the location of the node, determining whether the traffic is at least one of congested or unbalanced, either at, proximate to, or beyond the location of node along the route of travel; and, if the traffic is at least one of congested or unbalanced, either at, proximate to, or beyond the location of the node along the route of travel, modifying the route of travel for the vehicle by at least one of: 1) changing at least a portion of the route of travel of the vehicle; or, 2) replacing the route of travel of the vehicle with a new route of travel.

Optionally, the method is such that prior to determining whether the traffic is congested and/or unbalanced, continuously balancing the traffic.

Optionally, the method is such that the modifying the route of travel of the vehicle is performed to rebalance the traffic.

Optionally, the method is such that the location of the node is along the route of travel of the vehicle.

Optionally, the method is such that the particular computer additionally provides one or more of: a start time for the route of travel, an estimated arrival time at the destination point of the route of travel, and/or tolls along the route of travel, point in response to a request from the device associated with the vehicle for a route of travel to a destination point.

Optionally, the method is such that it additionally comprises receiving a request from a device associated with a vehicle for a route of travel to a destination point.

Optionally, the method is such that the device includes: a computerized device and/or a computer.

Optionally, the method is such that the device includes: a smartphone, an in-vehicle data terminal, and/or an interactive television.

Optionally, the method is such that the determining whether the vehicle is within the predetermined distance range from the location of the node includes detecting an electronic interaction between the node and a mobile unit associated with the vehicle.

Optionally, the method is such that the device includes the mobile unit.

Embodiments of the invention are directed to a method for vehicle collision avoidance. The method comprises: a first vehicle obtaining an image of a designated article of known dimensions; analyzing the image to determine the size and angular orientation of the designated article with respect to a known point of vehicle; and, applying triangulation to the designated article to determine the distance between the known point of the vehicle and the designated article.

Optionally, the method for vehicle collision avoidance is such that the designated article is associated with a second vehicle.

Optionally, the method for vehicle collision avoidance is such that the designated article is associated with a road sign and wherein the road sign image is presented on a display panel located at the first vehicle.

Optionally, the method for vehicle collision avoidance is such it additionally comprises, based on the triangulation, adjusting the distance between the first vehicle and the second vehicle.

Embodiments of the invention are directed to a method for landing an aircraft. The method comprises: obtaining an image of a designated landing area of known dimensions; analyzing the image to determine the size and angular orientation of the designated article with respect to a known point of the aircraft; and, applying triangulation to the designated article to determine the distance between the known point of the aircraft and the designated article.

Embodiments of the invention are directed to a computer system for routing vehicle traffic in an area. The computer system comprises: a non-transitory storage medium for storing computer components; and, a computerized processor for executing the computer components. The computer components comprise: a first module for providing a requesting device with a route of travel for a vehicle to a destination point in response to a request from the device associated with the vehicle for a route of travel to a destination point; a second module for determining whether the vehicle is within a predetermined distance range from the location of a node associated with a junction having a known location; a third module for responding to a determination that the vehicle is within the predetermined range from the location of the node; a fourth module for determining whether the traffic is congested and/or unbalanced, either at, proximate to, or beyond the location of the node along the route of travel; and, a fifth module for modifying the route of travel for the vehicle by at least one of: 1) changing at least a portion of the route of travel of the vehicle; or, 2) replacing the route of travel of the vehicle with a new route of travel, when the traffic is congested and/or unbalanced, either at, proximate to, or beyond the location of the node along the route of travel.

Optionally, the computer system is such that it additionally comprises a sixth module for continuously balancing the traffic.

Optionally, the computer system is such that fifth module for modifying the route of travel of the vehicle rebalances the traffic.

Optionally, the computer system is such that it additionally comprises: a computer system including at least one computer, the at least one computer including the first module, the second module, the third module, the fourth module and the fifth module; and, a node, remote from and in electronic and/or data communication with the computer system.

Optionally, the computer system is such that the first module additionally provides one or more of: a start time for the route of travel, an estimated arrival time at the destination point of the route of travel, and/or tolls along the route of travel, point in response to a request from the device associated with the vehicle for a route of travel to a destination point.

Optionally, the computer system is such that the first module is additionally receives requests from a device associated with a vehicle for a route of travel to a destination point.

Optionally, the computer system is such that the second module determines whether the vehicle is within the predetermined distance range from the location of the node by detecting an electronic interaction between the node and a mobile unit associated with the vehicle.

Embodiments of the invention are directed to a computer usable non-transitory storage medium having a computer program embodied thereon for causing a suitably programmed system to for routing vehicle traffic in an area, by performing the following steps when such program is executed on the system. The steps comprise: providing a requesting device with a route of travel for a vehicle to a destination point in response to a request from the device associated with the vehicle for a route of travel to a destination point; determining whether the vehicle is within a predetermined distance range from the location of a node associated with a junction having a known location; in response to a determination that the vehicle is within the predetermined distance range from the location of the node, determining whether the traffic is at least one of congested or unbalanced, either at, proximate to, or beyond the location of node along the route of travel; and, if the traffic is at least one of congested or unbalanced, either at, proximate to, or beyond the location of the node along the route of travel, modifying the route of travel for the vehicle by at least one of: 1) changing at least a portion of the route of travel of the vehicle; or, 2) replacing the route of travel of the vehicle with a new route of travel.

Optionally, the computer usable non-transitory storage medium is such that prior to determining whether the traffic is congested and/or unbalanced, continuously balancing the traffic.

Optionally, the computer usable non-transitory storage medium is such that the modifying the route of travel of the vehicle is performed to rebalance the traffic.

Optionally, the computer usable non-transitory storage medium is such that the location of the node is along the route of travel of the vehicle.

Optionally, the computer usable non-transitory storage medium is such that it additionally comprises: providing one or more of: a start time for the route of travel, an estimated arrival time at the destination point of the route of travel, and/or tolls along the route of travel, point in response to a request from the device associated with the vehicle for a route of travel to a destination point.

Optionally, the computer usable non-transitory storage medium is such that it additionally comprises, receiving a request from a device associated with a vehicle for a route of travel to a destination point.

Optionally, the computer usable non-transitory storage medium is such that the device includes: a computerized device and/or a computer.

Optionally, the computer usable non-transitory storage medium is such that the device includes: a smartphone, an in-vehicle data terminal, and/or an interactive television.

Optionally, the computer usable non-transitory storage medium is such that the determining whether the vehicle is within the predetermined distance range from the location of the node includes detecting an electronic interaction between the node and a mobile unit associated with the vehicle.

Optionally, the computer usable non-transitory storage medium is such that the device includes the mobile unit.

This document references terms that are used consistently or interchangeably herein. These terms, including variations thereof, are as follows.

A "computer" includes machines, computers and computing or computer systems (for example, physically separate locations or devices), servers, computer and computerized devices, processors, processing systems, computing cores (for example, shared devices), and similar systems, workstations, modules and combinations of the aforementioned. The aforementioned "computer" may be in various types, such as a personal computer (e.g., laptop, desktop, tablet computer), or any type of computing device, including mobile devices that can be readily transported from one location to another location (e.g., smartphone, personal digital assistant (PDA), mobile telephone or cellular telephone).

"Linked" as used herein, includes both wired and/or wireless links, such that the computers, servers, components, devices and the like, are in electronic and/or data communications with each other, directly or indirectly.

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings.

DETAILED DESCRIPTION OF THE DRAWINGS

Figure 1:
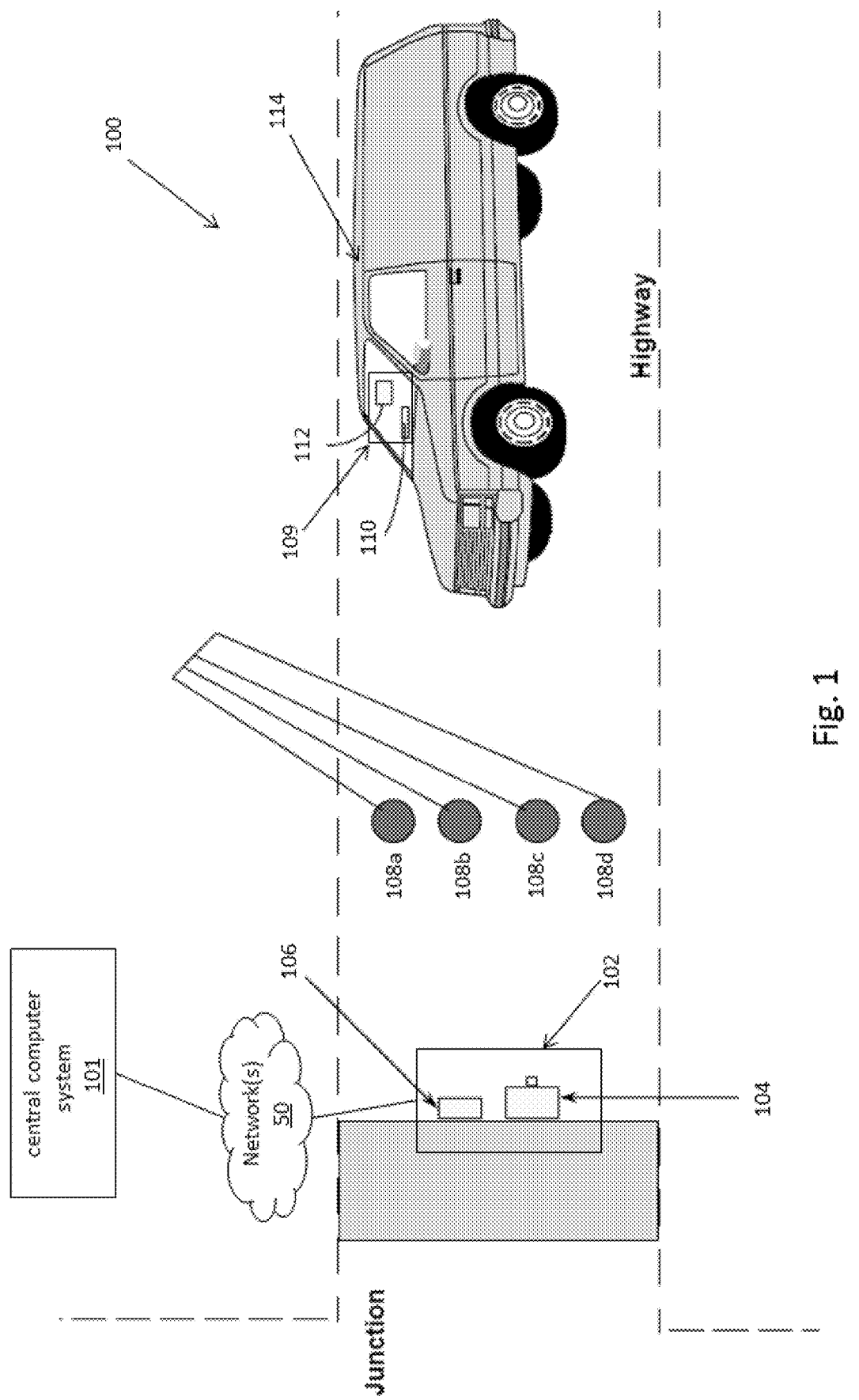
FIG. 1 is an illustration of the system according to an embodiment of the present invention.

Before explaining at least one embodiment of the invention in detail, it is to be understood that the invention is not necessarily limited in its application to the details of construction and the arrangement of the components and/or methods set forth in the following description and/or illustrated in the drawings. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more non-transitory computer readable (storage) medium(s) having computer readable program code embodied thereon.

The present invention provides a system combining navigational assistance and collision avoidance assistance. The present invention monitors and directs traffic loads, prevents vehicles collision, enforces traffic laws, collects road toll, and provides efficient and reliable inter-vehicle and vehicle-highway communication capabilities. The present invention can anticipate driving conditions ahead of time, for example, up to 30 minutes ahead as this is the average period of time in which the traffic is interchanged.

FIG. 1 is an illustration of the system 100 of the present invention. The system 100 includes a central computer system 101, formed of one or more computers. The central computer system 101 is linked over a network(s) 50 to a road unit or node 102 (the terms "road unit" and "node" used interchangeably herein) positioned, for example, remote from the central computer system 101, for example, at a junction. The junction is a point, object or the like, which has a known location in space, for example, on land or water, representable by longitude and latitude coordinates, Global Positioning System (GPS) coordinates and the like, and may also be an intersection of roads, a location where roads join, a bend in a road, a specific location along a roads, a structure on the road, such as a bridge, tunnel, traffic light, and the like. The network(s) 50 may be a single network or a combination of networks, including, for example, data networks, cellular networks, communications networks, and the like, and including local area networks (LAN) and wide area networks (WAN), including public networks such as the Internet. The road unit 102 includes a road receiver 104 and a road tag 106, and is connected to laser diode transmitters 108a-108d.

The system 100 further includes a mobile unit 109, which includes an ID Tag 110 and a mobile receiver 112. The mobile unit 109, ID Tag 110 and mobile receiver 112 are associated with a vehicle 114, and are, for example, in or on the vehicle 114.

The mobile unit 109 functions as a device (a computerized device or computer) and stores the data regarding the vehicle 114, for example, the vehicle's destination point, route of travel or traveling course ("route of travel" and "traveling course" used interchangeably herein), expected time of arrival to the requested destination, toll-costs involved and the like. The data is initially generated when the user enters, for example the destination point, and is updated when the vehicle 114 enters, or in in range (a distance range) of, for example, a junction. The destination point is entered using, for example, a device, such as an in-vehicle data terminal, a smartphone, a computer, an interactive TV and the like. The vehicle's data is generated using the system's database which includes, for example, the distribution of all the vehicles currently using the roads network, information regarding vehicles about to enter the roads network in the near future (for example, the next half an hour), the capacity of each road (the number of vehicles that can be directed into the road without causing a traffic jam) and the optimal velocity of each road section, according to its road capacity and traffic lights system, which will allow the system to regulate the number of vehicles entering a specific road segment.

After the vehicle's destination point is entered and the designated traveling course is provided, the system 100 monitors and tracks the vehicle's location throughout the traveling course, while updating the data stored in the mobile unit 109 accordingly, when arriving at a junction.

The central computer system 101 contains the designated traveling courses of all the vehicles currently using the system's roads network, as well as, the designated traveling courses of all the vehicles about to enter the system's roads network. The central computer system 101 continuously updates the road units 102 located within junction areas according to its data and according to the system's roads network.

Prior to starting the travel to the destination, the minimum toll-costs associated with the designated traveling course are presented to the driver and are updated during the drive (travel along the route of travel) whenever the driver decides to contravene with the system's designated traveling course. Contravening with the system's designated traveling course may subject the driver to higher toll payments, as well as, redirection to alternative longer traveling courses in order to prevent infrastructure congestion. The mobile unit 109 may include a card reader allowing toll payments to be debited to a credit card or smart card. Vehicles without ID tags entering the roads network are photographed for billing purposes.

When approaching a junction, for example, when the vehicle (device) is within range of the junction, the range being, for example, a predetermined range, such as up to 10 km from the junction, the vehicle 114, with its ID Tag 110 and mobile receiver 112, communicates with the laser diode transmitters 108a-108d. The vehicle's interaction with the laser diode transmitters 108a-108d creates an interference (electronic interaction), which opens an online communication between the mobile unit 109 and the road unit 102. This online communication allows the ID Tag 110 which is, for example, an electronic tag to transmit the stored data within mobile unit 109 (Vehicle ID, Destination Point, etc.) through the road receiver 104 into the road unit 102.

Once in the range of the junction, an update to the vehicle's designated traveling course is may be needed, for example, due to traffic congestion and/or unbalancing at a point at or proximate to the junction, or beyond the junction, along the route of travel. Here, the road unit 102, which was previously updated by the central computer system 101 of the new designated traveling course, instructs the mobile unit 109 to change (modify) the traveling course of the vehicle 114. The road tag 106 transmits the new directions for the remainder of the drive to the mobile receiver 112 based on the changes in the traffic load of the infrastructure. The transmitted data is presented on a designated displaying device, for example, a head-up display panel (not shown).

The transmitted data can be transferred directly from the road unit 102, without the need to communicate with the central computer system 101, as all the information regarding traveling courses is constantly being updated and transferred from the central computer system 101 into the junction units via the network(s) 50. The road unit 102 also uses network(s) 50 in order to update the central computer system 101 regarding information related to vehicles passing through the junction, such as destination points, vehicle codes and the like.

Figure 2:
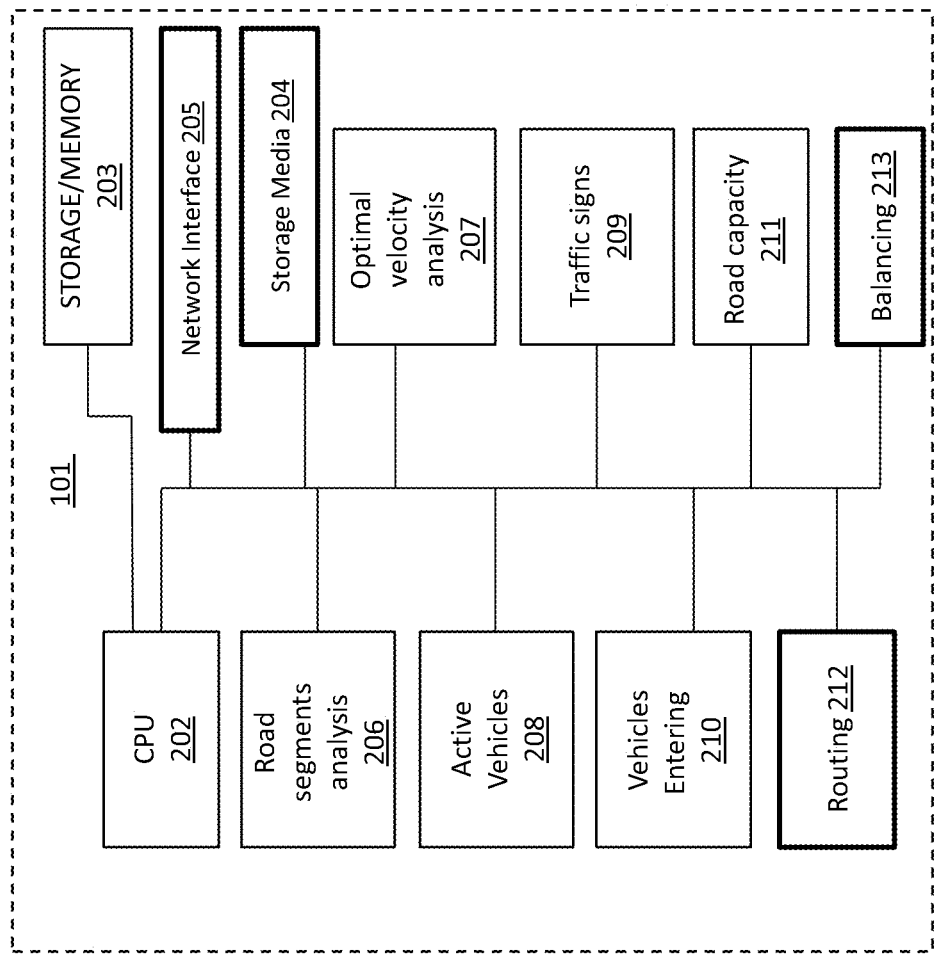
FIG. 2 is a block diagram of the central computer system according to an embodiment of the present invention.

FIG. 2 is a block diagram of the central computer system 101. The central computer system 101 includes processors (e.g., a Central Processing Unit (CPU) 202) linked to storage/memory 203. There is also data storage 204, a network interface 205 and modules 206-213, which operate in conjunction with the CPU 202 and storage/memory 204 to perform the present invention. All of the components 202, 203, 204, 205 and 206-213 are linked to each other so as to be in direct and/or indirect electronic and/or data communication with each other.

The CPU includes processors, also known as computerized processors, such as those known as x86 Processors from AMD and Intel, Xenon® and Pentium® processors from Intel, as well as any combinations thereof. Additional processors, including hardware processors, storage/memory, modules and storage media may also be part of the system for performing the invention.

Figure 5:
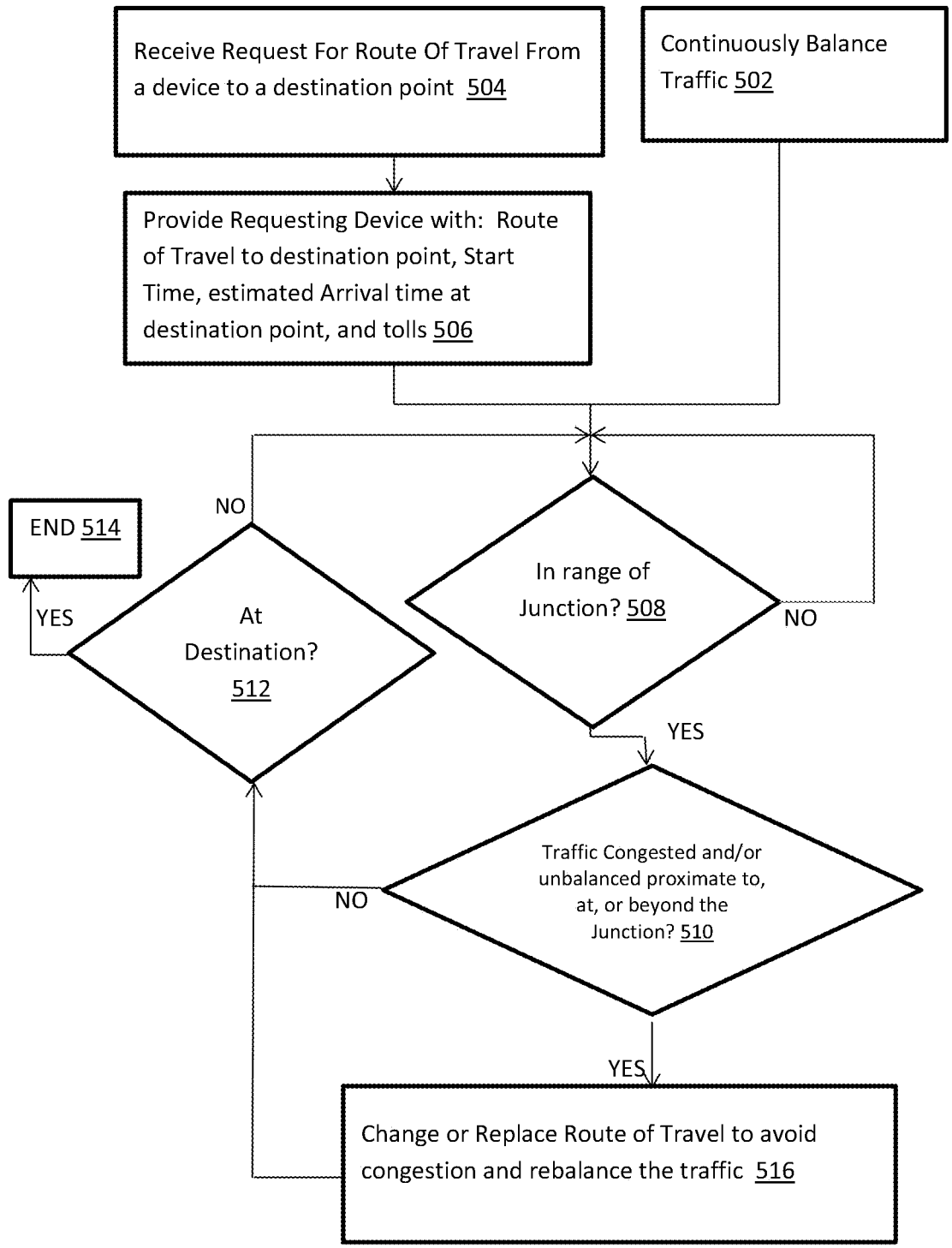
FIG. 5 is a flow diagram for a computer-implemented process in accordance with embodiments of the invention.

The storage/memory 203 stores machine-executable instructions executed by the CPU 202 for performing the processes of the invention, as disclosed herein, including the process of FIG. 5. The storage/memory 203 also provides temporary storage for the central computer system 101.

The data storage 204 includes databases associated with the operation of the invention in the central computer system 101.

The network interface 205 handles inbound and outbound communications from the network(s) 50.

The Road Segments Analysis module 206 serves to track the condition of all the road segments within the system's roads network.

The Optimal Velocity Analysis module 207 contains the optimal velocity of each segment within the system's roads network according to its road capacity and traffic lights system.

The Active Vehicles module 208 receives and monitors all routes of travel for all vehicles in the area and the roadway network of the area.

The Traffic signs module 209 contains all the information regarding the traffic signs and other road conditions such as bridges, tunnels, road obstructions, road construction, environmental conditions (which are reported to the central computer system 101 through the network(s)), such as rain, snow, temporary closures, road hazards, toll information, and the like within the system's roads network.

The Vehicles entering module 210 receives all the routes of travel for all vehicles entering the area.

The Road Capacity Module 211 contains the information regarding the number of vehicles that can be directed into each road segment within roadway network of the area, without causing a traffic jam.

Modules 206-211, alone or in combination are subject to updates at various time intervals, as programmed into the CPU 202, for example, via the storage/memory 204.

The routing module 212 runs algorithms, for example, WAZE®, available from Google of Mountain View, Calif., to provide routes of travel to computers, including devices such as the mobile unit 109, smart phones, automobile infotainment systems, and the like, associated with vehicles requesting to be routed to a destination point, for example, based on a desired arrival time and/or from a starting point. The starting point may, for example, be provided by either the computer user, as inputted into the computer or from a location service (geolocation) over the network 50, such as a Global Positioning System (GPS). The routing module 212 also determines whether to keep, augment (e.g., change a portion of the route of travel), or replace (with a new route of travel), the present route of travel for a vehicle, at a time when the vehicle is at a location associated with or in range of a road unit 102. The routing module 212, when the traffic is found to be not balanced, as determined by the balancing module 213, provides modifications to the routes of travel of the vehicle 114, by changing at least a portion of the route of travel of the vehicle 114, or replacing the route of travel of the vehicle 114 with a new route of travel.

The balancing module 213 functions to balance traffic on the roadway network of the area by using algorithms for evaluating road capacity, and providing data to the routing module 212, to change routes of travel or create original routes of travel to the user input destination points, based on traffic being congested and/or unbalanced at any given time, where a route of travel is being established, or changed when the vehicle 114 is associated with a road unit 102 at a location, for example, when the vehicle 114 is in range of the road unit 102 associated with a junction, along the route of travel of the vehicle 114.

Figure 3:
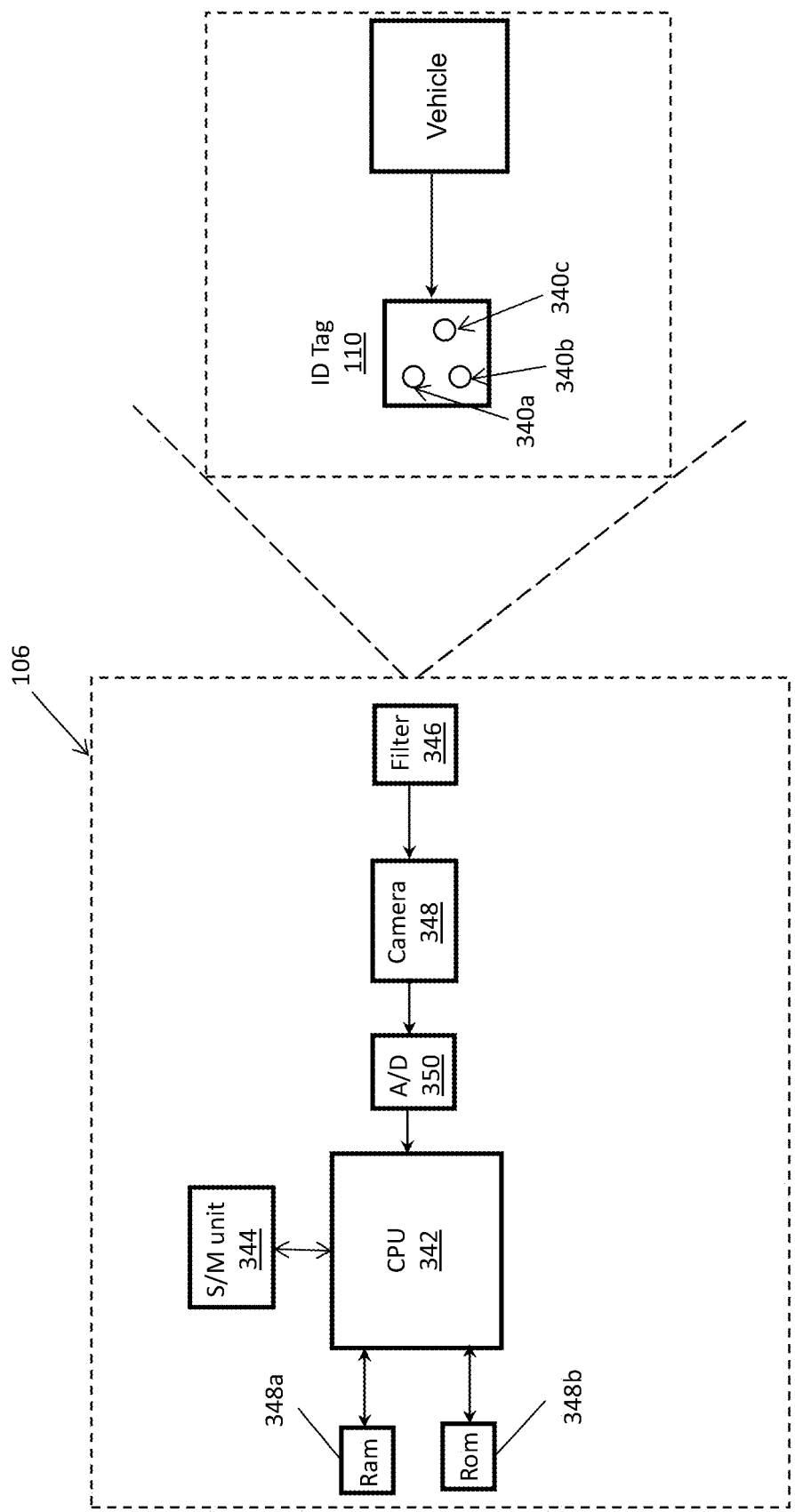
FIG. 3 is a block diagram of a road receiver interacting with a vehicle's ID Tag according to an embodiment of the present invention.

FIG. 3 is a block diagram of the road receiver 104 interacting with the ID Tag 110. The ID Tag 110 includes, for example, three light-emitting diodes (LEDs) 340a-340c, while the road receiver 104 includes a central processing unit (CPU) 342, a storage/memory unit 344, a filter 346, a camera 348 and an Analog-to-digital converter 350. Programs for running the CPU 342 are stored in the storage/memory unit 344. The CPU 342 is in electronic and/or data communication with the filter 446 for processing the digital data converted by the A/D 350.

In operation, the three light-emitting diodes (LEDs) 340a-340c generate a designated analog signal, for example, a light emitting signal that is modulated continually on and off to generate specific code for transmitting the necessary data (for example, vehicle identification code). The designated analog signal is then filtered by the filter 346 and transferred through the camera 338 into the Analog-to-digital converter 350. The Analog-to-digital converter 350 converts the transferred analog signal entering the camera 348 into a digital signal that can be processed by the CPU 342.

The system 100 further transmits road signs and road curves (each time there is a turn or a curvature) to both the mobile unit 109 and the designated display panel (not shown), using road tags that are located on, for example, traffic signs, traffic lights, and the like.

Figure 4:
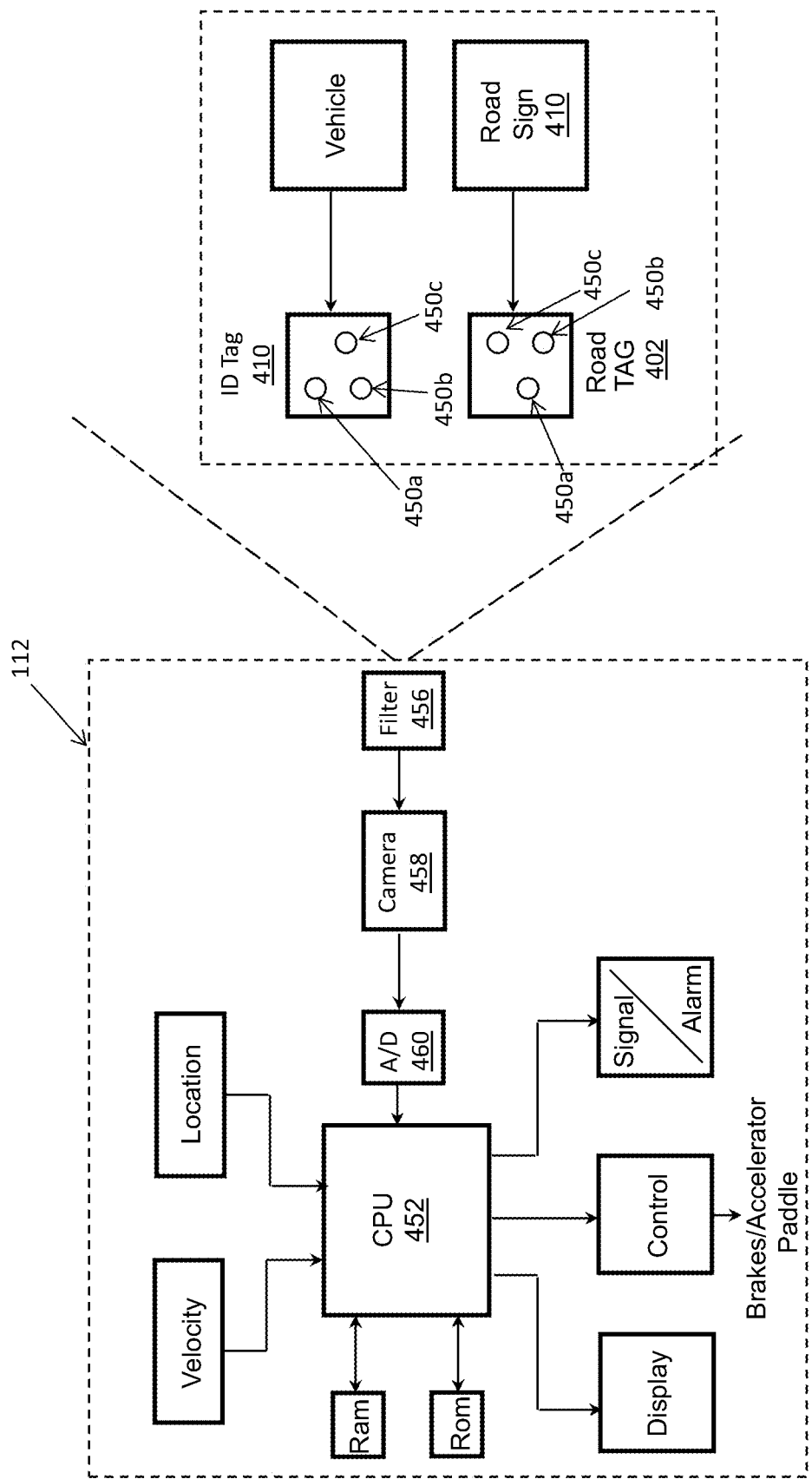
FIG. 4 is a block diagram of a mobile receiver interacting with either a second vehicle's ID Tag or a tag of a road sign according to an embodiment of the present invention.

FIG. 4 is a block diagram of the mobile receiver 112 interacting with an ID Tag 410 of a second vehicle or a tag of a road sign 402. The interaction between the mobile receiver 112 and the second vehicle or road sign tags occurs during the course of a regular drive and not only when approaching a junction.

Both the ID Tag 410 and the tag of the road sign 402 include, for example, three light-emitting diodes (LEDs) 450a-450c used for generating a designated analog signal that is modulated continually on and off to generate specific code for transmitting the necessary data. The mobile receiver 112 includes a central processing unit (CPU) 452. Programs for running the CPU 452, as well as programs for signaling/alarming the driver, controlling the vehicle's pedaling systems and displaying navigational data are stored in the storage/memory unit 454. The CPU 452 is in electronic and/or data communication with a filter 456 through a camera 458 and an Analog-to-digital converter A/D 460 used for processing the designated analog signal transferred from the ID Tag 410 of a second vehicle or the tag of the road sign 402. The filter 456, the camera 458 and the Analog-to-digital converter 460 convert the transferred analog signal into a digital signal that can be processed by the CPU 452. In case the designated analog signal is transferred from the ID Tag 410 of the second vehicle, the geometric structure of the ID Tag 410 is captured in the image of the frame created within the mobile receiver 112. The ID Tag 410 size and the angle in the image allow the calculation of the Tag's distance, as well as, its relative location by triangulation. The CPU 452 computes the derivative of ID Tag 410 size and angle in order to calculate the relative velocity vector, which is then used to determine the time of collision by dividing the distance by the velocity vector. This allows the mobile unit to prevent vehicles collision by adjusting the distance between the vehicles if necessary. In addition, the mobile unit can operate on the vehicle's pedaling systems e.g., the brakes, the accelerator, etc. in order to further prevent accidents, collisions and the like.

FIG. 5 shows a flow diagram for a computer-implemented process in accordance with embodiments of the disclosed subject matter. The process and sub-processes of FIG. 5 are computerized processes performed by the central computer system 101 to show a route of travel for a vehicle being analyzed when the vehicle 114, via its associated mobile unit 109 is interacting (electronically) with the road unit or node (of the central computer system) 102, is at (or proximate to) the road unit 102, such that the vehicle 114 is at a location corresponding to the location of the road unit 102. The aforementioned processes and sub-processes can be, for example, performed automatically, and, for example, in real time.

At block 502, the central computer system 101 is continuously updating the vehicular traffic in the area, and continuously balancing the traffic in the area. From block 502, the process moves to block 508.

Contemporaneous with the process of block 502, the central computer system 101 receives a request from a device, computer or the like (hereinafter "device"), associated with the vehicle 114, for a route of travel to a destination point, at block 504. The process moves to block 506, where the central computer system 101 provides the requesting device with: a route of travel to the destination point (from a provided or geolocated (e.g., Global Positioning System) starting point, a start time for the travel, an estimated arrival time at the destination point, and tolls, if there are any.

From blocks 502 and 506, the process moves to or is now at block 508. At block 508, the node 102, in communication with the central computer system 101, determines whether the vehicle is within a predetermined range (distance range) of the junction (for example, up to 10 km from the junction and its corresponding node 102). This predetermined range also includes being proximate to or at the junction. This determination (whether the vehicle is within the range of the node 102 at the junction) includes detecting an interaction (e.g., electronic and/or data communication) between the node 102 and the mobile unit 109, when the mobile unit 109 is within the predetermined range (distance range) of the node 102 (junction). Should the vehicle 114 not be in the predetermined range (distance range) from the junction (e.g., road unit or node 102 corresponding thereto), the interaction between the node 102/mobile unit 109 does not occur, and the process resumes from block 508.

Remaining at block 508, should the vehicle 114 be within range (predetermined range or distance range) of the junction (e.g., up to 10 km from the node 102 associated with and/or corresponding to the junction), based on detection of the interaction between the node 102 and the mobile unit 109, the process moves to block 510.

At block 510, a determination is made by the central computer system 101, whether the traffic at, proximate to, or beyond the junction, along the provided route of travel is congested and/or unbalanced. The determination of whether the traffic is congested and/or unbalanced may, for example, be in accordance with one or more predetermined thresholds.

At block 510, should the traffic not be congested and/or unbalanced, the vehicle 114 continues on its initial or previous route of travel, as this route of travel remains unchanged. The process moves to block 512 where it is determined whether the vehicle 114 has reached its destination. If no, the process returns to block 508, from where it resumes. If yes, the process moves to block 514, where it ends.

Returning to block 510, should the traffic be congested and/or unbalanced, the process moves to block 516. At block 516, the present route of travel is modified, for example, by either changing it, by changing a portion of the route of travel, or completely replacing the previous route of travel with a new route of travel. The aforementioned modification of the route of travel results in rebalancing or attempting to rebalance the traffic. From block 516, the process moves to block 512, from where it resumes, as detailed above. The process continues in cycles until the vehicle 114 reaches its destination point from the provided route of travel.

Figure 6A:
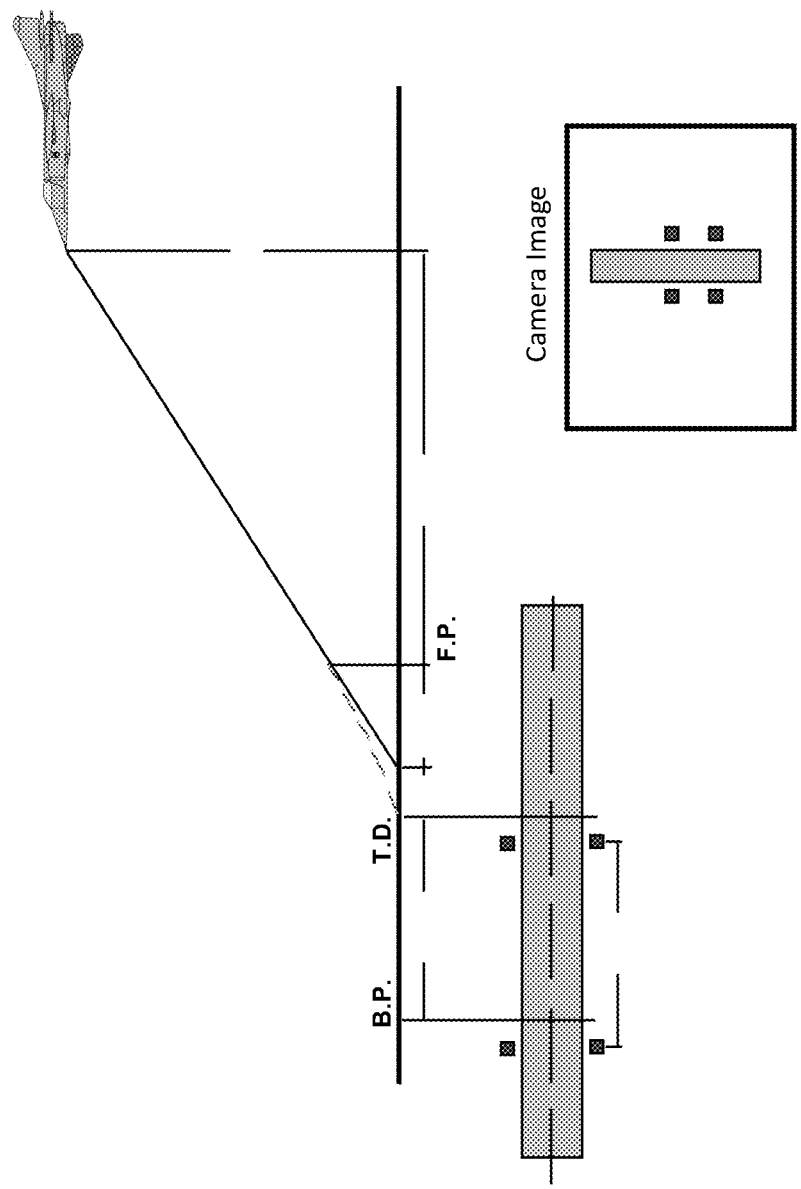
FIG. 6A is an illustration of the system according to another embodiment of the present invention; and, FIG. 6B is a block diagram of an airplane receiver interacting with a landing Tag according to an embodiment of the present invention
Figure 6B:
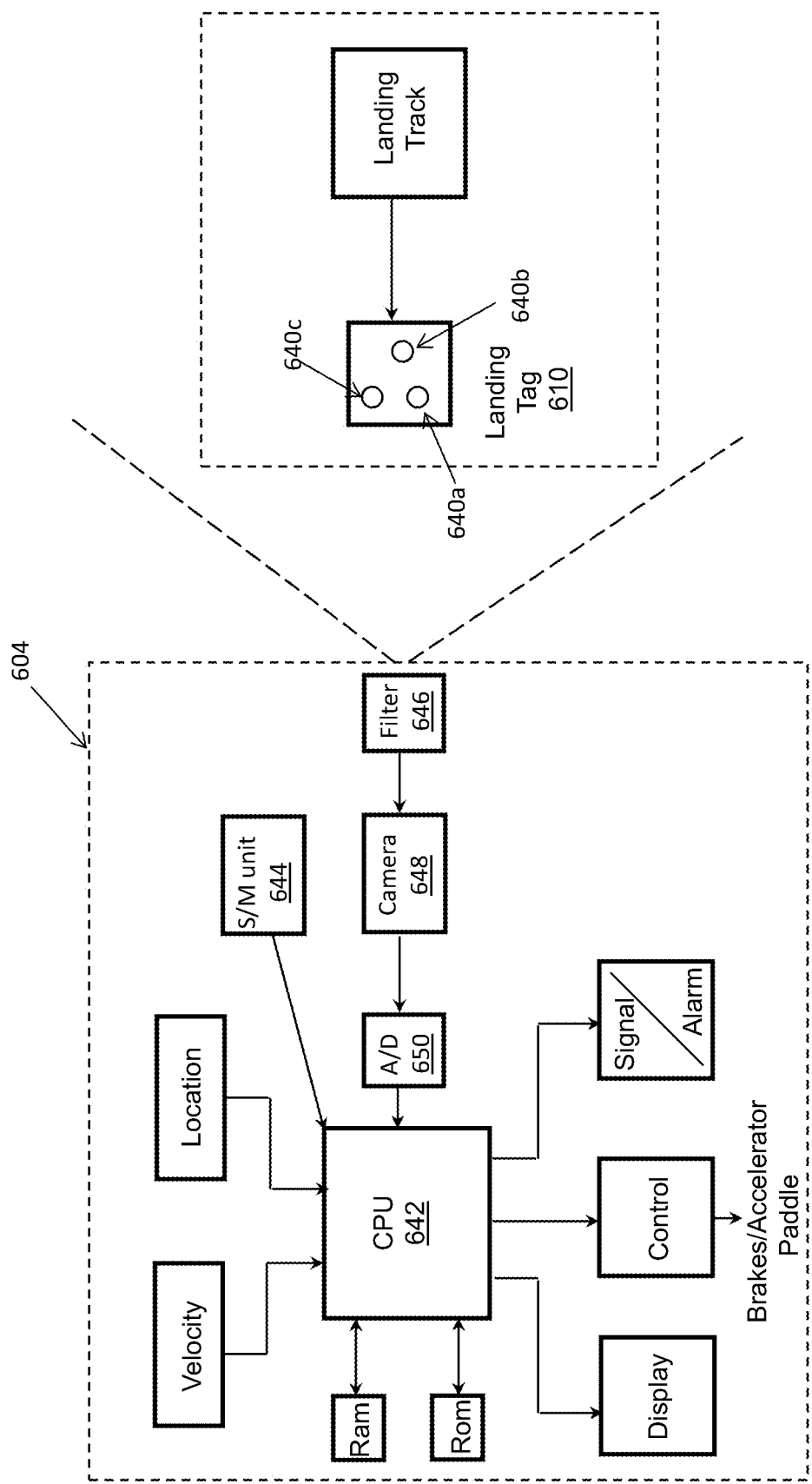

In another embodiment, the present invention can be assembled on other means of transportation, such as airplanes and the like, in order to allow the automatic and efficient landing of airplanes on landing tracks by using the interaction between an airplane unit located on the airplane and a landing track unit located at the landing tracks area (FIG. 6). FIG. 6B is a block diagram of the airplane receiver 604 interacting with the landing Tag 610. The landing Tag 610 includes, for example, three light-emitting diodes (LEDs) 640a-640c, while the airplane receiver 604 includes a central processing unit (CPU) 642, a storage/memory unit 644, a filter 646, a camera 648 and an Analog-to-digital converter 650. Programs for running the CPU 642 are stored in the storage/memory unit 644. The CPU 642 is in electronic and/or data communication with the filter 646 for processing the digital data converted by the A/D 650.

In operation, the three light-emitting diodes (LEDs) 640a-640c generate a designated analog signal, for example, a light emitting signal that is modulated continually on and off to generate specific code for transmitting the necessary data. The designated analog signal is then filtered by the filter 646 and transferred through the camera 648 into the Analog-to-digital converter 650. The Analog-to-digital converter 650 converts the transferred analog signal entering the camera 648 into a digital signal that can be processed by the CPU 642. The CPU 642 then calculates its relative position as opposed to the landing Tag 610 by triangulation of the Tag character in the receiver's created image, operates the airplane's systems, and allows the automatic and efficient landing of airplanes on the landing track. In addition, the camera 648 generates a camera image of the landing track (As shown in FIG. 6A).

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, non-transitory storage media such as a magnetic hard-disk and/or removable media, for storing instructions and/or data. Optionally, a network connection is provided as well. A display and/or a user input device such as a keyboard or mouse are optionally provided as well.

For example, any combination of one or more non-transitory computer readable (storage) medium(s) may be utilized in accordance with the above-listed embodiments of the present invention. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable non-transitory storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

As will be understood with reference to the paragraphs and the referenced drawings, provided above, various embodiments of computer-implemented methods are provided herein, some of which can be performed by various embodiments of apparatuses and systems described herein and some of which can be performed according to instructions stored in non-transitory computer-readable storage media described herein. Still, some embodiments of computer-implemented methods provided herein can be performed by other apparatuses or systems and can be performed according to instructions stored in computer-readable storage media other than that described herein, as will become apparent to those having skill in the art with reference to the embodiments described herein. Any reference to systems and computer-readable storage media with respect to the following computer-implemented methods is provided for explanatory purposes, and is not intended to limit any of such systems and any of such non-transitory computer-readable storage media with regard to embodiments of computer-implemented methods described above. Likewise, any reference to the following computer-implemented methods with respect to systems and computer-readable storage media is provided for explanatory purposes, and is not intended to limit any of such computer-implemented methods disclosed herein.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the singular form "a", "an" and "the" include plural references unless the context clearly dictates otherwise.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

The above-described processes including portions thereof can be performed by software, hardware and combinations thereof. These processes and portions thereof can be performed by computers, computer-type devices, workstations, processors, micro-processors, other electronic searching tools and memory and other non-transitory storage-type devices associated therewith. The processes and portions thereof can also be embodied in programmable non-transitory storage media, for example, compact discs (CDs) or other discs including magnetic, optical, etc., readable by a machine or the like, or other computer usable storage media, including magnetic, optical, or semiconductor storage, or other source of electronic signals.

The processes (methods) and systems, including components thereof, herein have been described with exemplary reference to specific hardware and software. The processes (methods) have been described as exemplary, whereby specific steps and their order can be omitted and/or changed by persons of ordinary skill in the art to reduce these embodiments to practice without undue experimentation. The processes (methods) and systems have been described in a manner sufficient to enable persons of ordinary skill in the art to readily adapt other hardware and software as may be needed to reduce any of the embodiments to practice without undue experimentation and using conventional techniques.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A method for routing vehicle traffic in-on a roadway network of an area comprising:
    using a particular computer to provide a requesting device associated with a vehicle with a route of travel for the vehicle to a destination point in response to a request from the device associated with the vehicle for a route of travel to a destination point;
    determining whether the vehicle is within a predetermined distance range from the a location of a node associated with a junction having a known location, the node being in communication with the particular computer, the determining including detecting an interaction between the node and a mobile unit of the vehicle when the vehicle is within the predetermined distance range, the mobile unit including light emitting diodes (LEDs) and a mobile receiver and an ID Tag;
    in response to a determination that the vehicle is within the predetermined distance range from the location of the node,
    using said LEDs on the vehicle to emit a signal that is modulated continually on and off to generate specific code for transmitting necessary data to the node, said necessary data including at least said route of travel to said destination point, and
    determining whether the traffic is congested, either at, proximate to, or beyond the location of node along the route of travel and, at least once, employing a balancing module configured to balance the vehicle traffic on the roadway network of the area by using algorithms for evaluating road capacity; and,
    if the traffic is congested, either at, proximate to, or beyond the location of the node along the route of travel,
    employing a routing module to change routes of travel or create original routes of travel to the user input destination points, based on traffic being congested by modifying the route of travel for the vehicle by at changing at least a portion of the route of travel of the vehicle; and
    transmitting the modified route of travel from the node to said mobile receiver of the vehicle;
    wherein at least one update to the vehicle's designated route is made due to traffic congestion at a point along the designated route of travel responsive to a road unit, previously updated by a central computer system of a new designated traveling course, instructing said mobile unit to change the vehicle's route and wherein a road tag transmits new directions for a remainder of the vehicle's drive to said mobile receiver based on changes in traffic load of infrastructure,
    wherein said balancing module provides data to the routing module, to change routes of travel to user input destination point/s, based on traffic being congested at any given time, wherein said LEDs are included in said ID tag with which a road receiver interacts, wherein the road receiver includes a central processing unit (CPU), programs for running the CPU stored on a storage/memory unit, a filter, a camera and an Analog-to-digital converter and wherein the CPU is in electronic and/or data communication with the filter for processing the digital data converted by the Analog-to-digital converter, and wherein said LEDS comprise at least three light-emitting diodes (LEDs) which generate a designated analog signal, modulated to generate said specific code for transmitting a vehicle identification code and wherein the designated analog signal is filtered by the filter and transferred through the camera into the Analog-to-digital converter which converts the transferred analog signal entering the camera into a digital signal that can be processed by the CPU.

2. The method of claim 1, also comprising continuously balancing the traffic prior to determining whether the traffic is congested.

3. The method of claim 1, wherein the modifying the route of travel of the vehicle is performed to rebalance the traffic.

4. The method of claim 1, wherein the location of the node is along the route of travel of the vehicle.

5. The method of claim 1, wherein the particular computer additionally provides one or more of: a start time for the route of travel, an estimated arrival time at the destination point of the route of travel, and/or tolls along the route of travel, in response to a request from the device associated with the vehicle for a route of travel to a destination point.

6. The method of claim 1, additionally comprising, receiving a request from a device associated with a vehicle for a route of travel to a destination point.

7. The method of claim 6, wherein the device includes: a smartphone, an in-vehicle data terminal, and/or an interactive television.

8. A computer usable non-transitory storage medium having a computer program embodied thereon for causing a suitably programmed system to route vehicle traffic on a roadway network of an area, by performing a method when such program is executed on the system, the method comprising:

providing a requesting device with a route of travel for a vehicle to a destination point in response to a request from a device associated with the vehicle for a route of travel to a destination point;

determining whether the vehicle is within a predetermined distance range from the a location of a node associated with a junction having a known location, the determining including detecting an interaction between the node and a mobile unit of the vehicle when the vehicle is within the predetermined distance range, the mobile unit including light emitting diodes (LEDs) and a mobile receiver:

in response to a determination that the vehicle is within the predetermined distance range from the location of the node, said LEDs on the vehicle emitting a signal that is modulated continually on and off to generate specific code for transmitting necessary data to the node, said necessary data including at least said route of travel to said destination point, and determining whether the traffic is congested, either at, proximate to, or beyond the location of node along the route of travel; and, if the traffic is congested, either at, proximate to, or beyond the location of the node along the route of travel, modifying the route of travel for the vehicle by changing at least a portion of the route of travel of the vehicle, wherein at least one update to the vehicle's designated route is made due to traffic congestion at a point along the designated route of travel responsive to a road unit, previously updated by a central computer system of a new designated traveling course, instructing said mobile unit to change the vehicle's route and wherein a road tag transmits new directions for a remainder of the vehicle's drive to said mobile receiver based on changes in traffic load of infrastructure, wherein said balancing module provides data to the routing module, to change routes of travel to user input destination point/s, based on traffic being congested at any given time, wherein said LEDs are included in said ID tag with which a road receiver interacts, wherein the road receiver includes a central processing unit (CPU), programs for running the CPU stored on a storage/memory unit, a filter, a camera and an Analog-to-digital converter and wherein the CPU is in electronic and/or data communication with the filter for processing the digital data converted by the Analog-to-digital converter, and wherein said LEDS comprise at least three light-emitting diodes (LEDs) which generate a designated analog signal, modulated to generate said specific code for transmitting a vehicle identification code and wherein the designated analog signal is filtered by the filter and transferred through the camera into the Analog-to-digital converter which converts the transferred analog signal entering the camera into a digital signal that can be processed by the CPU.

9. The computer usable non-transitory storage medium of claim 8, wherein the method comprises continuously balancing the traffic prior to determining whether the traffic is congested.

10. The computer usable non-transitory storage medium of claim 8, wherein the method comprises modifying the route of travel of the vehicle to rebalance the traffic.

11. The computer usable non-transitory storage medium of claim 8, wherein, in said determining, the location of the node is along the route of travel of the vehicle.

12. The computer usable non-transitory storage medium of claim 8, wherein the method additionally comprises providing one or more of: a start time for the route of travel, an estimated arrival time at the destination point of the route of travel, and/or tolls along the route of travel, a point in response to a request from the device associated with the vehicle for a route of travel to a destination point.

13. The computer usable non-transitory storage medium of claim 8, said method additionally comprising receiving a request from a device associated with a vehicle for a route of travel to a destination point.

14. A system configured to implement a method for routing vehicle traffic in-on a roadway network of an area, comprising:

a particular computer providing a requesting device associated with a vehicle with a route of travel for the vehicle to a destination point in response to a request from the device associated with the vehicle for a route of travel to a destination point, the method comprising determining whether the vehicle is within a predetermined distance range from the a location of a node associated with a junction having a known location, the node being in communication with the particular computer, the determining including detecting an interaction between the node and a mobile unit of the vehicle when the vehicle is within the predetermined distance range, the mobile unit including light emitting diodes (LEDs) and a mobile receiver and an ID Tag;

in response to a determination that the vehicle is within the predetermined distance range from the location of the node, said LEDs on the vehicle emitting a signal that is modulated continually on and off to generate specific code for transmitting necessary data to the node, said necessary data including at least said route of travel to said destination point, and determining whether the traffic is congested, either at, proximate to, or beyond the location of node along the route of travel and, at least once, employing a balancing module configured to balance the vehicle traffic on the roadway network of the area by using algorithms for evaluating road capacity; and, if the traffic is congested, either at, proximate to, or beyond the location of the node along the route of travel, employing a routing module to change routes of travel or create original routes of travel to the user input destination points, based on traffic being congested by modifying the route of travel for the vehicle by at changing at least a portion of the route of travel of the vehicle; and transmitting the modified route of travel from the node to said mobile receiver of the vehicle wherein at least one update to the vehicle's designated route is made due to traffic congestion at a point along the designated route of travel responsive to a road unit, previously updated by a central computer system of a new designated traveling course, instructing said mobile unit to change the vehicle's route and wherein a road tag transmits new directions for a remainder of the vehicle's drive to said mobile receiver based on changes in traffic load of infrastructure, wherein said balancing module provides data to the routing module, to change routes of travel to user input destination point/s, based on traffic being congested at any given time, wherein said LEDs are included in said ID tag with which a road receiver interacts, wherein the road receiver includes a central processing unit (CPU), programs for running the CPU stored on a storage/memory unit, a filter, a camera and an Analog-to-digital converter and wherein the CPU is in electronic and/or data communication with the filter for processing the digital data converted by the Analog-to-digital converter, and wherein said LEDS comprise at least three light-emitting diodes (LEDs) which generate a designated analog signal, modulated to generate said specific code for transmitting a vehicle identification code and wherein the designated analog signal is filtered by the filter and transferred through the camera into the Analog-to-digital converter which converts the transferred analog signal entering the camera into a digital signal that can be processed by the CPU.

15. A method according to claim 1 wherein, at least once, an update to the vehicle's designated traveling course is provided and wherein the road unit, previously updated by the central computer system of the new designated traveling course, instructs the mobile unit to modify the vehicle's route and wherein at least one road tag transmits data comprising new directions for driving to the mobile receiver based on changes in traffic load of infrastructure and wherein, accordingly, the transmitted data is presented on a head-up display panel and wherein road signs and road curves are transmitted each time there is a turn or a curvature to the mobile unit and to the head-up display panel, using at least one road tags located along the road.

16. A method according to claim 1 wherein responsive to at least one designated analog signal being transferred from a road or vehicle Tag, the tag's geometric structure is captured in an image of the frame created within the road/vehicle receiver and wherein the tag's distance and/or relative location are derived from ID Tag size and an angle in the image.

* * * * *